United States Patent [19]

Tanaka et al.

[11] Patent Number: 4,656,700

[45] Date of Patent: Apr. 14, 1987

[54] LIGHTWEIGHT, MULTIPLE-POINT, QUICK-RELEASE, SAFETY BUCKLE FOR BODY HARNESSES

[75] Inventors: Akira Tanaka, Northridge; Hans Unger, Sylmar, both of Calif.

[73] Assignee: American Safety Equipment Corporation, Troy, Mich.

[21] Appl. No.: 803,821

[22] Filed: Dec. 2, 1985

[51] Int. Cl.⁴ .................. A44B 11/25; A44B 17/00
[52] U.S. Cl. ....................................... 24/574; 24/631; 24/632; 24/639
[58] Field of Search .............. 24/574, 631, 632, 639; 297/483

[56] References Cited

U.S. PATENT DOCUMENTS

| | | |
|---|---|---|
| 2,504,125 | 4/1950 | Hight ................................. 24/632 |
| 2,892,232 | 6/1959 | Quilter . |
| 2,899,732 | 8/1959 | Cushman . |
| 2,921,353 | 1/1960 | Cushman . |
| 3,046,982 | 7/1962 | Davis . |
| 3,106,004 | 10/1963 | Davis ................................. 24/632 |
| 3,364,532 | 1/1968 | Hatfield . |
| 3,451,720 | 6/1969 | Makinen . |
| 3,473,291 | 10/1969 | Hopka . |
| 3,491,414 | 1/1970 | Stoffel . |
| 3,512,839 | 5/1970 | Norman . |
| 3,523,341 | 8/1970 | Spires . |
| 3,564,672 | 2/1971 | McIntyre . |
| 3,605,207 | 9/1971 | Glauser . |
| 3,617,019 | 11/1971 | Femia ................................ 24/631 |
| 3,639,948 | 2/1972 | Sherman ........................... 24/632 |
| 3,673,645 | 7/1972 | Burleigh . |
| 3,747,167 | 7/1973 | Pravaz ............................... 24/574 |
| 3,825,979 | 7/1974 | Jakob . |
| 4,128,924 | 12/1978 | Happel et al. ..................... 24/632 |

FOREIGN PATENT DOCUMENTS 640880  5/1962  Canada .................................. 24/631

*Primary Examiner*—Victor N. Sakran
*Attorney, Agent, or Firm*—Poms, Smith, Lande & Rose

[57] ABSTRACT

A lightweight, multiple-point, quick-release, safety buckle for body harnesses is disclosed in two preferred embodiments having a pair of shoulder harnesses, a waist belt and a crotch strap having connector ends meeting to engage within the device which has a housing comprised of a plastic cover rotatable relative to a plastic base which encloses a pair of metal plates to form a retaining space for the harness end-connectors and a plurality of cam-actuated pawls to releasably-retain the strap connector ends for their quick-release upon a rotation of the cover, and further, containing a finger-actuated lever to selectively quick-release only one or more of the straps.

9 Claims, 13 Drawing Figures

U.S. Patent  Apr. 14, 1987  Sheet 1 of 6  4,656,700
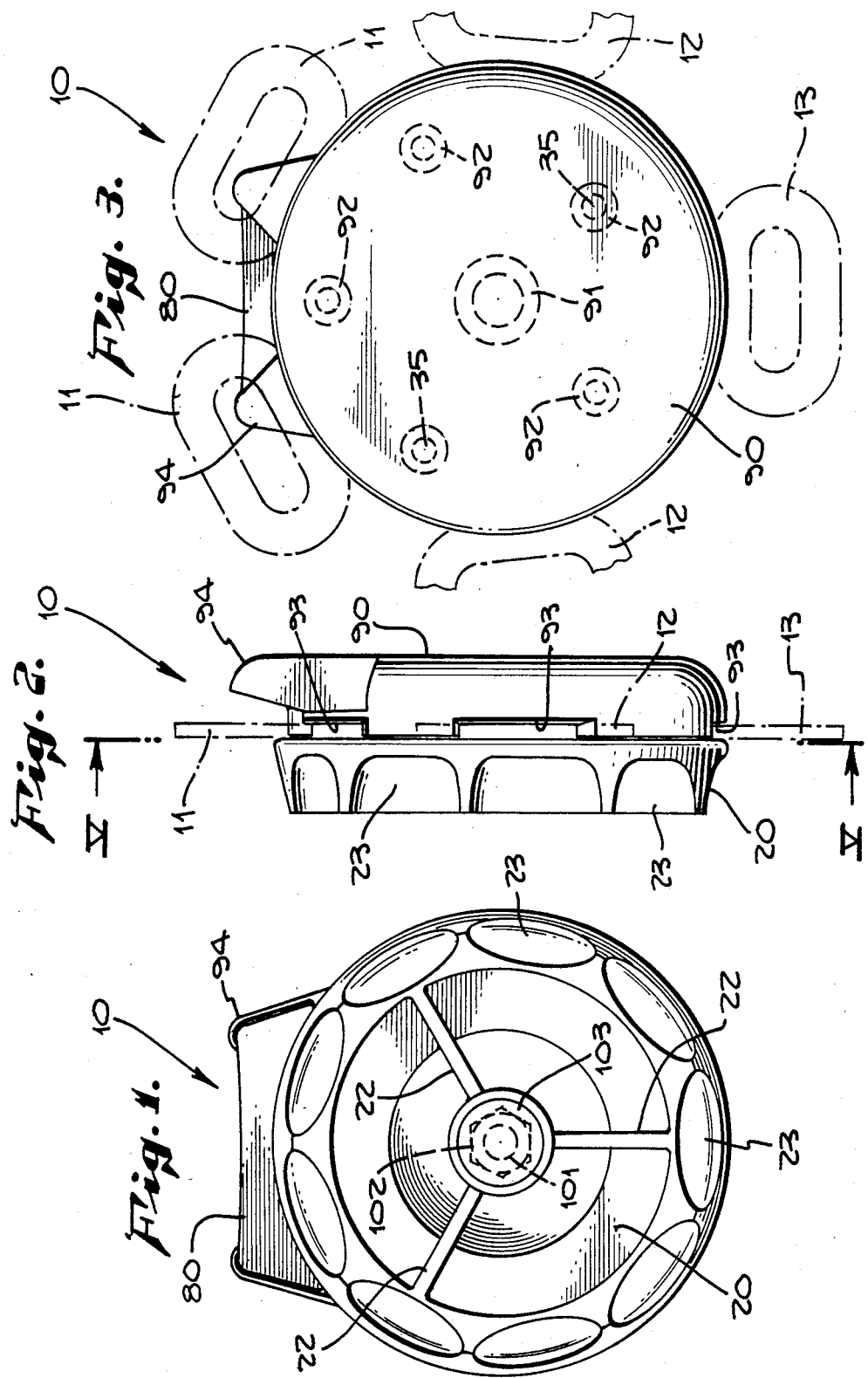

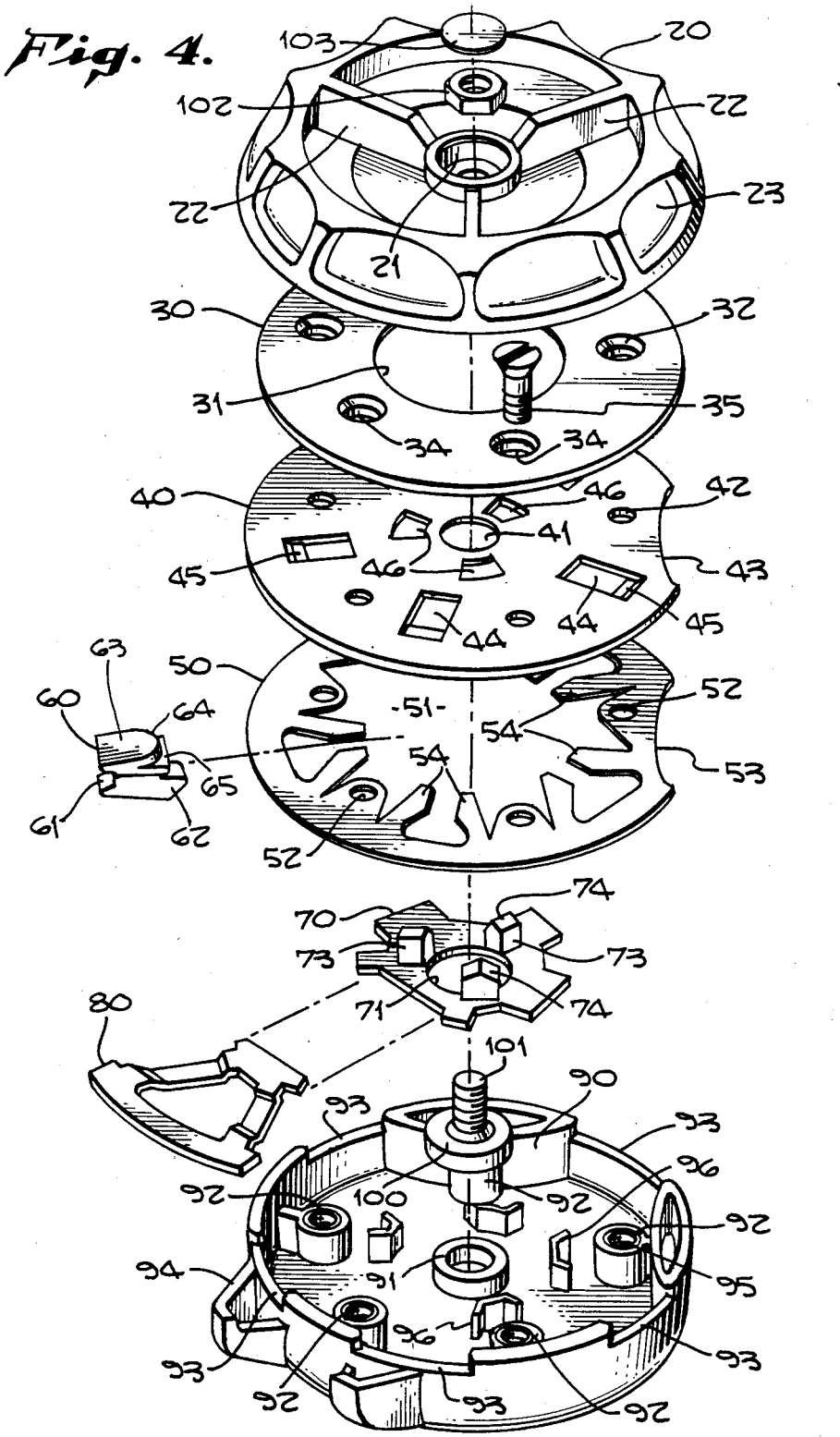

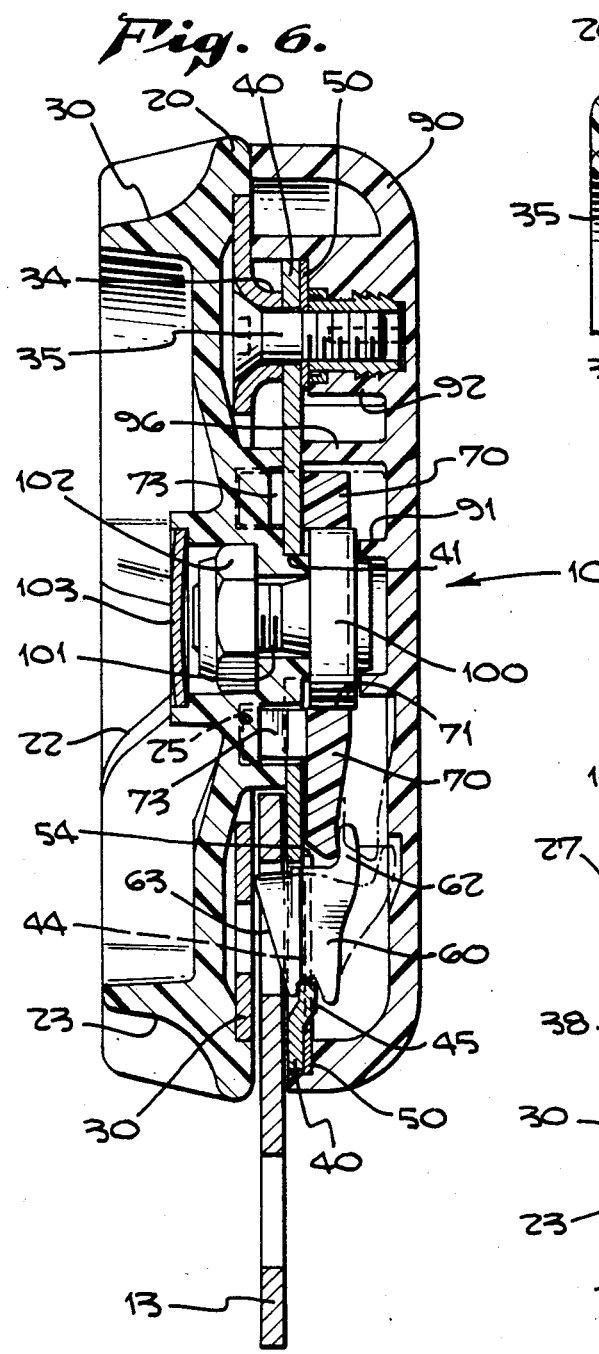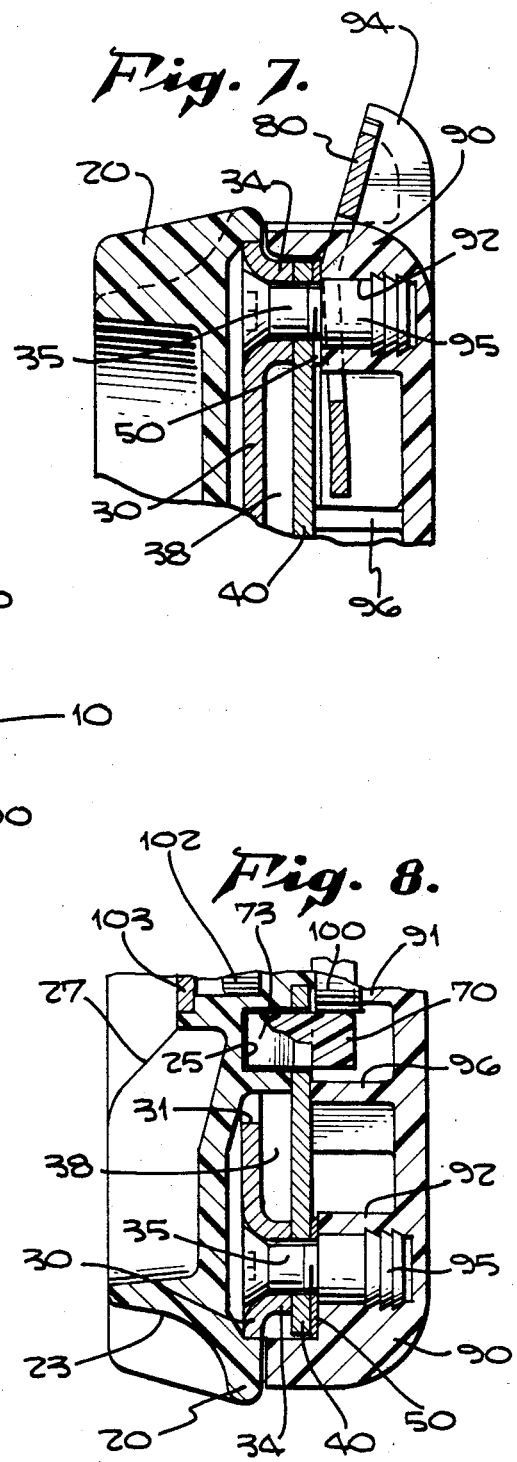

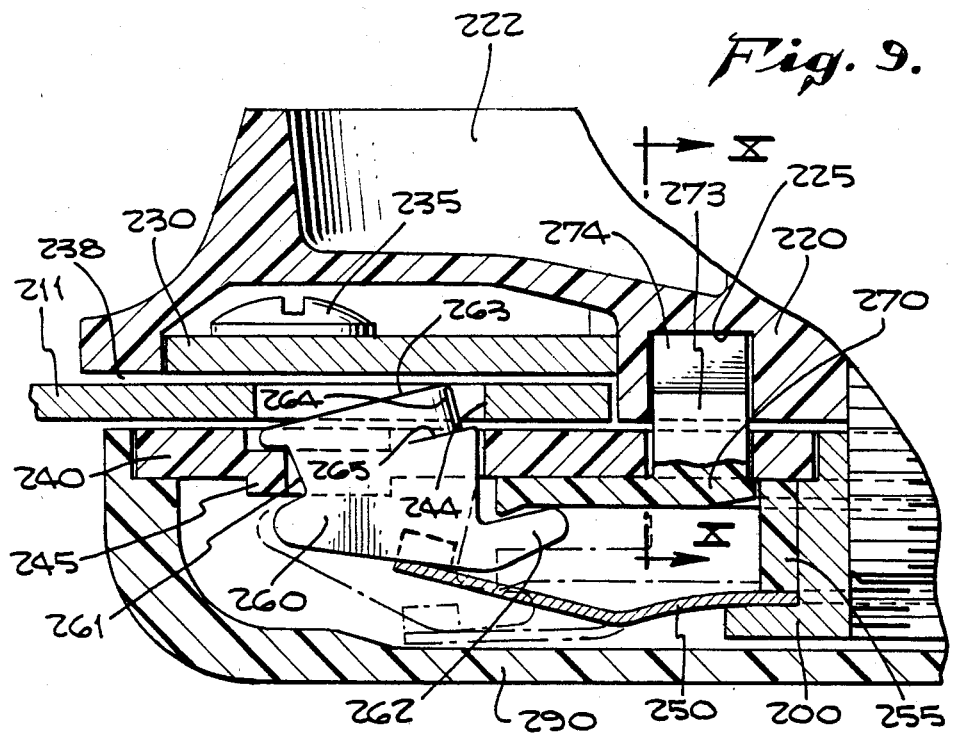
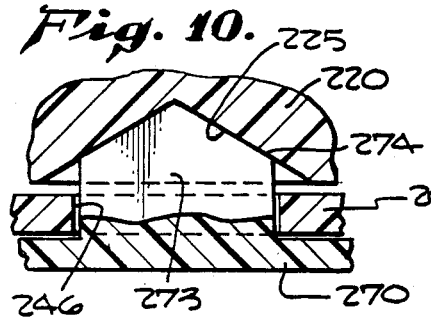
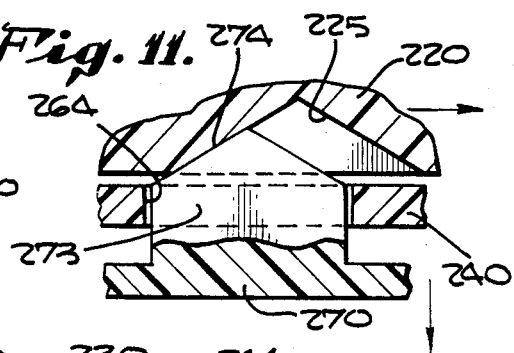
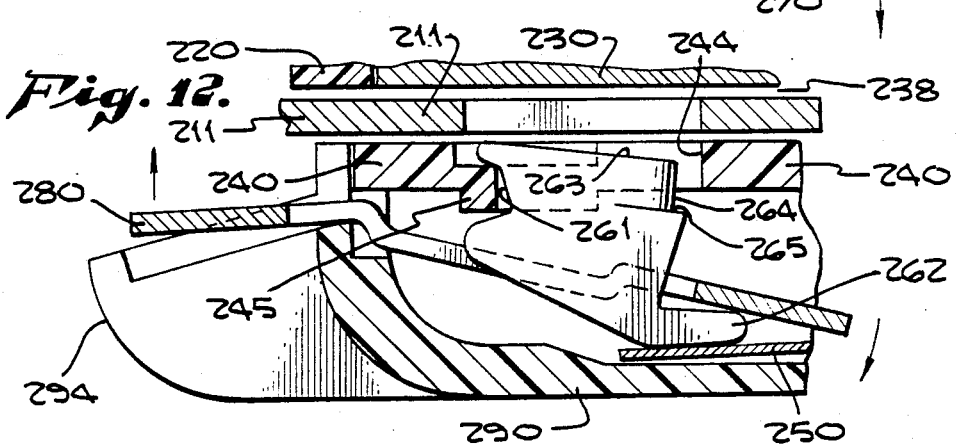

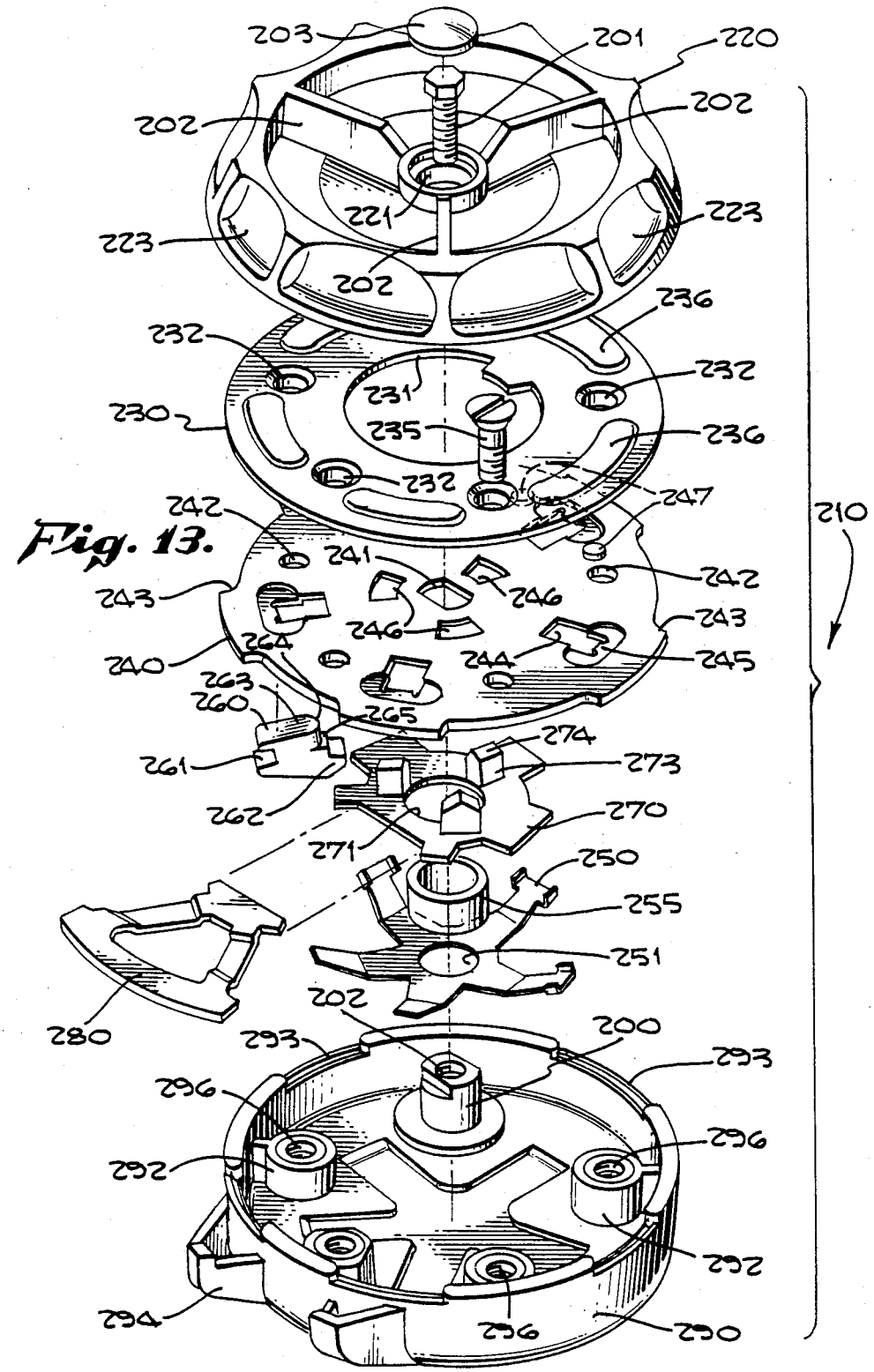

LIGHTWEIGHT, MULTIPLE-POINT, QUICK-RELEASE, SAFETY BUCKLE FOR BODY HARNESSES

BACKGROUND OF THE INVENTION

This invention relates, in general, to buckles for safety harnesses and in particular, to a lightweight, multiple-point, quick-release, safety buckle for body harnesses.

The use of safety belts, or harnesses, to restrain the human torso within a high-performance vehicle, e.g., in racing cars, or in high-performance aircraft, is well known in the art.

Typically, a plurality of cloth, leather or synthetic straps are adjustably-attached at one end to some part of the vehicle, such as the seat or floor, and are provided at their other ends with a end-connector, usually metal, which is releasably-engaged within a buckle device whose purpose it is to retain the connector ends together whereby a harness is formed of the straps to retain the vehicle's operator or passengers firmly within their seats until the mechanism of the buckle is actuated to release the ends of the straps, whereby the wearer of the harness is released from its hold.

The familiar embodiments of these restraining devices are the simple seat belts found on the seats of many commercial airliners having a pair of straps retained to the seat or floor of the aircraft, one strap having a releasable buckle at its outer end and the other a connector to engage within the buckle. This same familiar embodiment may be found in automobiles manufactured in this decade, often in conjunction with a third strap which passes across the chest of the driver to restrain the upper torso.

In yet another familiar embodiment of this apparatus which is often associated with high-performance vehicles such as racing-cars, aircraft or speed boats, a series of five straps are utilized to form the harness, in which two of the straps pass over the shoulders of the wearer, two pass about the wearer's waist, and a fifth strap passes through the legs and through the wearer's crotch, and all join at a buckle which may be located anywhere in a region from the wearer's waist up to the mid-point of the chest, which serves to restrain the wearer firmly within the seat of the vehicle during high-speed maneuvers and which also serves to help prevent injury to the wearer by collision of the wearer's body with the interior of the vehicle in the event of a crash.

In all of the familiar embodiments, it is desirable that the materials and construction of the apparatus be strong enough to withstand the high gravitational and/or inertial forces imposed upon the harness by the wearer's body during high-speed maneuvers or during a crash, yet be quickly-releasable, for both convenience and safety reasons which are obvious.

It is also further desirable that the overall apparatus be as light in weight and comfortable for the wearer as the degree of restraint imposed will permit.

Typically, the buckle part is retained at the end of one of the straps of the harness such that the buckle will remain with the vehicle when the wearer of the harness releases it for egress of the wearer from the vehicle. Further, it is not unusual for the buckle to be provided with means whereby the two shoulder straps may be selectively released while the three remaining straps are retained within the buckle to enable the wearer of the harness to lean forward, for example, to reach a remotely-located object or control.

Exemplary of such multiple-point, quick-release buckles are those disclosed in U.S. Pat. No. 2,899,732 to Cushman, U.S. Pat. No. 2,921,353, also to Cushman, and U.S. Pat. No. 3,825,979 to Jakob, and assigned to the present assignee.

A review of these references shows that they have in common, in addition to the above-referenced operational features, the following additional functional requirements. First, the ends of the straps must be retained within the buckle so as to withstand axial forces imparted to the straps by the wearer's body. This is typically accomplished by means of pawls which extend into apertures within the connector ends of the straps (usually metallic) which prevent a movement of the connector ends in an axial direction relative to the buckle unless and until the pawls are withdrawn from their respective apertures.

Second, the buckle must withstand rotational forces applied to the connector ends by the straps which would tend to rotate the connector ends about an axis through their planes within the buckle, and which would disengage the pawls from the belt end connectors, unless constrained to lie within the plane of the buckle. This is accomplished in the prior art by providing a pair of planar, rigid surfaces on the rear side of the cover of the buckle's housing and the front side of the rear member of the buckle's housing, respectively. Accordingly, it becomes necessary to make these portions of the buckle's housing, including the rotating actuator or handle, of a strong, rigid material, usually metal. Unfortunately, this results in a buckle that is heavy and expensive to machine or cast, and further, prevents the fabrication of major portions of the buckle from materials that are lighter in weight, inexpensive and easy to fabricate, such as thermosetting plastics or thermoplastics.

It is therefore an object of the present invention to provide a multiple-point, quick-release safety buckle for harnesses that is lighter in weight and incorporates more inexpensive materials which are also easier to fabricate, while incorporating all of the functional requirements of strength, safety, quickness of operation and convenience of the prior art.

It is a further object of the present invention to provide a safety buckle that is inexpensive to manufacture and easy to assemble, yet which retains the same safety and reliability features.

These objects are preferably accomplished by providing a buckle having a pair of spaced, parallel steel plates to receive the tongues of the straps' endconnectors therebetween and further, having one or more pawl-receiving apertures within the plates which permit the connector-engaging metallic pawls, which are pivotally-mounted on one of the steel plates, to rotate in and out of the tongue-retaining space, whereby the connectors are retained in, or released from, the buckle in the axial direction, and the connector ends are prevented from rotating by the presence of the pair of plates, and the whole affair may be contained within, and actuated by, lightweight, inexpensive plastic parts that are easy to fabricate.

A complete understanding of these objects and advantages, and others to which this invention lends itself, will become obvious to those skilled in the art by a consideration of the following detailed description of two preferred embodiments of the invention and a review of the accompanying drawings, of which the following is a brief description.

BRIEF DESCRIPTION OF THE DRAWINGS

FIG. 1 is a frontal view of an exemplary first preferred embodiment of the present invention;

FIG. 2 is a side view of the first exemplary preferred embodiment of the present invention with associated harness-strap end-connectors shown in phantomed lines and a section V—V taken through the plane of the buckle;

FIG. 3 is a rear view of the first exemplary preferred embodiment of the present invention;

FIG. 4 is an exploded, isometric view of the first exemplary preferred embodiment of the present invention showing the various components spread out for clarity;

FIG. 6 is a sectional view into the first exemplary preferred embodiment of the present invention as revealed by taking the section VI—VI in FIG. 5.

FIG. 7 is another sectional view into the first exemplary preferred embodiment of the present invention as revealed by taking the section VII—VII in FIG. 5;

FIG. 8 is yet another sectional view into the first exemplary preferred embodiment of the present invention as revealed by taking the section VIII—VIII in FIG. 5;

FIG. 9 is a sectional view of a second exemplary preferred embodiment of the present invention in which a section X—X is taken looking into the pawl-actuator detent in the handle;

FIG. 10 is a sectional view through the second exemplary preferred embodiment of the present invention showing the cammed surface of the pawl actuator engaged within a detent within the handle as revealed by the section X—X taken in FIG. 9;

FIG. 11 is the same sectional view as shown in FIG. 10 in which the handle has been rotated to the right, showing the movement of the cammed, pawl actuator in the downward direction which results;

FIG. 12 is a sectional view through the second exemplary preferred embodiment of the present invention which shows the effect of moving the shoulder-harness release lever upon the harness-retaining pawl;

FIG. 13 is an exploded view of the exemplary, second preferred embodiment of the present invention with the parts separated for comparison.

DETAILED DESCRIPTION OF TWO PREFERRED EMBODIMENTS OF THE INVENTION

Figure 5:
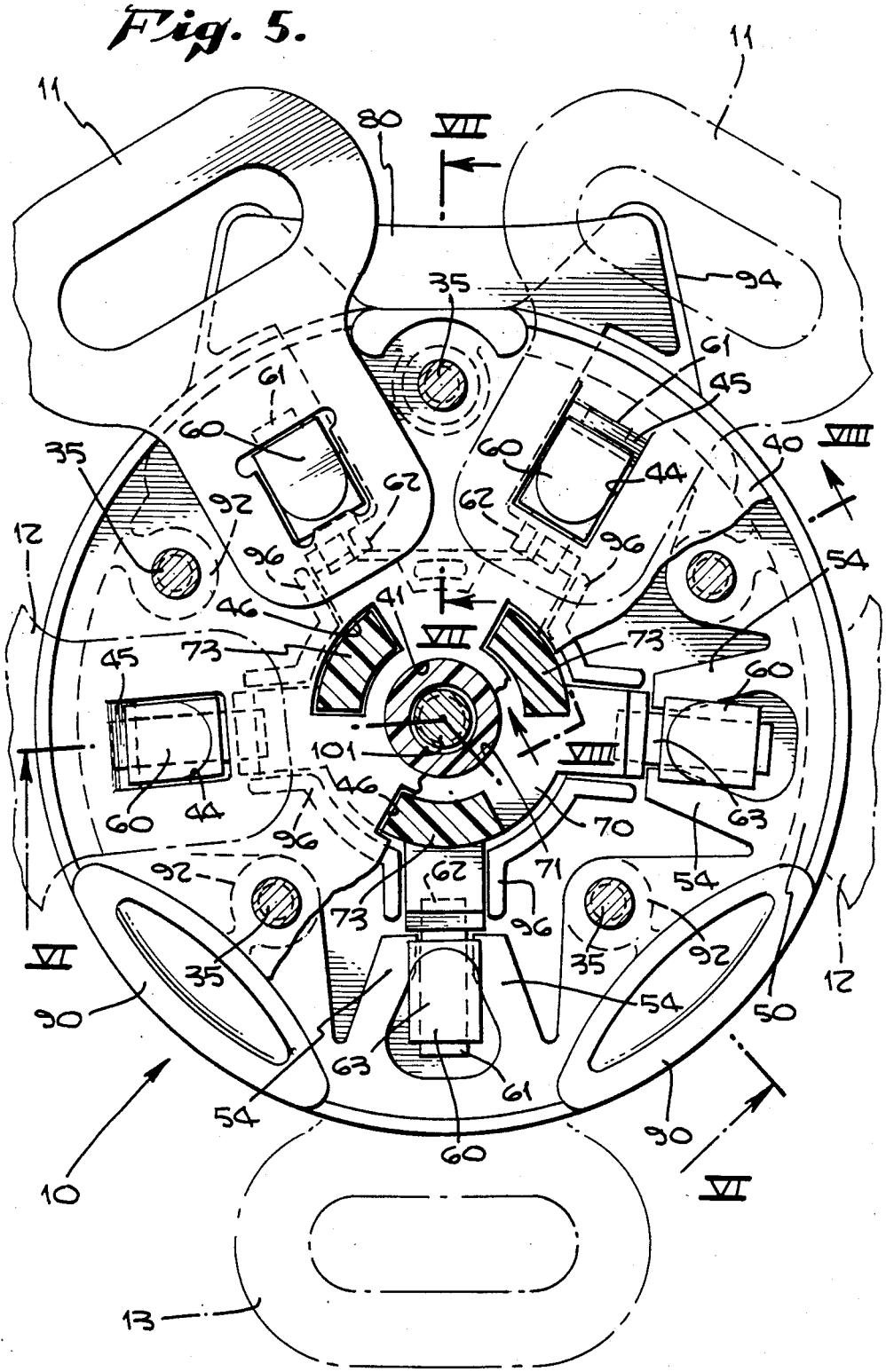
FIG. 5 is a sectional view through the body of the first exemplary preferred embodiment of the present invention as revealed by the section V—V taken in FIG. 2.

Turning now to the drawings, and in particular, FIGS. 1 through 4, an exemplary first preferred embodiment of the present invention, a lightweight, multiple-point, quick-release, safety buckle 10 for body harnesses is illustrated, with harness-strap tongue plates from the shoulder strap 11, the waist straps 12 and the crotch strap 13 shown in phantom lines (See FIG. 3).

The invention consists substantially of a "sandwich" of parts revealed more completely in the exploded view of FIG. 4.

A lightweight, plastic outer handle 20 sandwiches between itself and a lightweight, plastic base 90 a pair of rigid, metal plates 30 and 40 which are spaced apart by drawn or stamped shoulders 34 to create a tongue-plate receiving space 38 (See FIGS. 7 and 8) between plates 30 and 40. Strong, metal pawls 60 pivot about a pivot shoulder 61 on the pawl 60 located on a pivot flange 45 drawn or stamped into the inner plate 40 such that the pawl 60 may swing outward into the tongue-plate receiving space 38 through apertures 44 drawn or stamped into the lower plate 40 by spring fingers 54 which are part of a disc spring 50 located between the lower plate 40 and the plastic housing 90.

The pawls 60 are provided with a radius 64 on their locking face to permit a slight rotation of the associated tongue plate with respect to pawl 60 to prevent unlatching in the event of a twisting movement of the respective tongue plate relative to buckle 10. A stop 65 at the base of radius 64 limits the upward travel of pawl 60 relative to its respective tongue plate.

The pawls 60 also each have a flange 62 which engages a mating flange on a pawl actuator 70 which has cams 73 having an inclined-plane cam surface 74 which pass up through the spring 50, through apertures 46 in the inner plate 40, through a central aperture 31 in the outer plate 30 and engage within mating detents 25 which are cast into the handle 20. When the fingers of the wearer grasp the ribs 22 or knurled surface 23 of handle 20 and rotate the handle 20 either clockwise or anticlockwise through an arc of predetermined angle, the cam detent 25 urges the cam actuator 70 downward against the pawl actuating flange 62, which in turn, causes the pawl 60 to pivot inward about the pivot flange 45 and against the spring fingers 54 of spring 50, which in turn causes the pawl 60 to release the tongue plate of the related strap and the harness falls loose. By releasing the handle 20, the cam action of the above-described process is reversed, and the pawls 60 are urged back into the tongue-plate-receiving space 38, ready to engage their respective tongue-plates 11, 12 or 13, which is accomplished by simply inserting a given tongue-plate into slots 93 on the outside surface of the base 90 and into the tongue-plate receiving space 38 until the tongue-plate encounters, and slides past, an inclined plane 63 on pawl 60, which urges the pawl 60 inward until the tongue-plate has passed the pawl 60, at which point it returns to its initial position, thereby locking the tongue-plate in place.

In order to insure that the buckle 10 is retained in the vehicle with its associated harness, it is usual to attach buckle 10 permanently to one of the associated straps, typically one of waist straps 12 or the crotch strap 13. This may be accomplished by deleting the appropriate mating flange on paul actuator 70, thereby preventing the actuation of the pawl 60 associated with the strap to which buckle 10 is to be permanently attached. Alternatively, the appropriate flange 62 may be deleted from the pawl 60 associated with the particular strap, which accomplishes the same function. In either implementation, buckle 10 is then permanently attached to the strap selected for that purpose by simply inserting the associated tongue plate of that strap into the appropriate tongue-plate receiving space 38.

In the exemplary first preferred embodiment illustrated in the drawings, the buckle 10 is further provided with a shoulder-strap release lever 80 which is pivotally-mounted between bosses 94 on the base 90 and which extends above the pawl actuator 70 such that, when the lever 80 is actuated by the fingers of the wearer, the pawl actuator 70 is caused to pivot about an axis lying in the plane of the actuator 70, which causes the buckle 10 to selectively-release only the two shoulderharness strap tongue-plates 11, while retaining the remainder of the harness straps in the locked position. This is a convenience feature which permits the wearer to temporarily release the restraint upon his or her shoulders, e.g., to reach a remote object, while still being restrained safely by the harness at the waist.

In the exemplary first preferred embodiment of the present invention, the plates 30 and 40, spring 50, the pawls 60, the cam actuator 70, the harness-release lever 80 and a threaded stud 101 having a spacer shoulder 100 are all retained in place within the inner base 90 by means of threaded fasteners 35 which pass through fastener apertures 32, 42 and 52 within the outer plate 30, the inner plate 40 and the spring 50, respectively, to engage into threaded inserts 95 fixed within mounting bosses 92 which are part of the base 90. Appropriate spacing of these components within the "sandwich" from the floor of the base 90 is accomplished by means of spacing bosses 91 and shoulders 96 which are also molded into the plastic base 90.

The handle 20 is then rotatably-attached by means of a nut 102 which simply threads onto the threaded shaft 101 which passes outward through central apertures 71, 51, 41, 31 and 21 within the pawl actuator 70, the spring 50, the inner plate 40, the outer plate 30 and the handle 20, respectively. A closure cap 103 serves to protect the handle mounting nut 102 and to lend the buckle 10 an attractive, finished appearance from the front.

A second exemplary preferred embodiment of the present invention is illustrated in FIGS. 9–13, and differs from the first preferred embodiment illustrated primarily in the details of the pair of spaced plates 230 and 240 and the implementation of the pawl-actuator spring 250.

The second exemplary preferred embodiment of the present invention is illustrated in an exploded view in FIG. 13. In this embodiment, outer plate 230 contains a plurality of reinforcing dimples 236 stamped or embossed into plate 230 during fabrication. Additionally, inner plate 240 contains a plurality of pins 247 embossed or press-fitted into plate 240 during manufacture to serve as guide members when inserting the tongue plates into their respective tongue-plate receiving spaces 238 and to provide resistance to rotational movement of the tongue plates within their respective receiving space 238 after insertion.

In the exemplary second preferred embodiment of the buckle 210, the pawl spring 250 is implemented differently than the equivalent pawl spring 50 in the exemplary first preferred embodiment of the buckle 10. In the buckle 210, the pawl spring 250 is also located below a spacer bushing 255. A threaded bushing 200 having a threaded bore 202 therethrough permits the handle 220 to be rotatably-mounted by use of a handle mounting bolt 201 which passes through the central apertures 221, 231, 241, 271 and 151 of the handle 220, outer plate 230, inner plate 240, pawl actuator 270 and pawl spring 250, respectively, as before.

In either preferred embodiment illustrated, and as particulalry contemplated as being part of the present invention, there is the provision of a pair of spaced plates 30 and 40 or 230 and 240, respectively. It has been found that these plates may be simply stamped and/or drawn from a single piece of steel plate-stock, which simultaneously generates the part and creates the features and apertures described above. It is this pairing of simple, rigid, steel plates at a controlled distance which serves to define the tongue-plate receiving space 38 and which serves to prevent rotation of the tongue-plate within the buckle as described above, while still permitting these two key parts to be fabricated from inexpensive plate-stock in a simple stamping operation. Additionally, the plate 30 and 40 serve to resist the shear and bending moments imparted to the buckle 10 by the harness through the pawls 60, which are pivoted on the inner plate 40 to permit the pawls 60 to swing in and out of the tongue-plate receiving space 38. This, in turn, permits the use of lightweight, inexpensive injection-molded plastics in the fabrication of the handle 20 and base 90, as well as the pawl actuator 70.

In either preferred embodiment it is anticipated that the handle 20 and base 90 will be injection molded from a strong thermoplastic which will permit the incorporation of many detail features, such as the web 22 and finger knurl 23 of the handle 20 and the mounting bosses 92, slots 93 and shoulders 94 of the base 90 in a product that is strong, light in weight, relatively inexpensive and attractive in appearance. The tongue-plate-locking pawls 60 and 260 must be strong to withstand the axial force of the harness straps when the torso of the wearer forces against the inward side of the base 90 or 290. Accordingly, it is contemplated that, in the preferred embodiment, these pawls 60 or 260 will be forged or cast from a strong metal alloy, but they may also be amenable to sintered-powder-metal methods of fabrication.

The pawl springs 50 or 251 may be simply stamped and formed from a sheet of appropriate spring material, e.g., high-carbon steel alloy or beryllium copper, and then heat-treated in the conventional manner to achieve the spring rate desired.

Although the two exemplary preferred embodiments illustrated both depict a 5-point harness-strap attachment scheme, it will be obvious to those skilled in the art that by suitable modification of the designs, buckles having any reasonable number of attachment points could be easily obtained. Similarly, the above-mentioned materials and methods of fabrications are mentioned only for exemplary purposes, and others will readily suggest themselves to those skilled and practiced in the art. Accordingly, our invention, a lightweight, multiple-point, quick-release, safety buckle for body harnesses 10 should be limited in scope only by the following claims.

We claim:

1. A multiple-point, quick-release, safety buckle for a body harness comprising:
   - a lightweight, non-load-bearing plastic handle and a lightweight, non-load-bearing plastic base, said handle being rotatable relative to said base;
   - a load-bearing, releasably-locking tongue plate subassembly consisting of a pair only of metal plates and means for holding said plates in a spaced, fixed relationship to provide a tongue-plate-receiving space therebetween;
   - one or more load-bearing pawls and means for mounting them for pivotal movement on one of said metal plates into, and out of, said tongue-place-receiving space;
   - means for mounting said plastic handle and base in non-load-bearing relation to said pair of metal plates; and
   - means for operating said pawls associated with said pair of metal plates and said plastic handle whereby said pawls transfer the loading of said tongue plates located in said space to only said pair of metal plates and rotation of said handle relative to said base pivots said pawls out of said tongue-plate-receiving space between said metal plates.

2. The device as recited in claim 1, further comprising:
means for biasing said one or more pawls in said pivotal movement relative to said one of said metal plates into said tongue-plate-receiving space; and
means for mounting said pawl biasing means to said one of said metal plates.

3. A multiple-point, quick-release, safety buckle for body harnesses comprising:
a plate sub-assembly consisting of a pair of metal plates and means for holding them in a spaced, generally parallel relationship to provide a belt-end connector space therebetween;
one or more pawls and means for mounting them for pivotal movement into and out of said belt-end connector space;
a pawl actuator and means for mounting said actuator to said plate sub-assembly for pivoting one or more pawls out of said belt-end connector space when operated in a predetermined manner; and
a handle mounted to said plate sub-assembly and having means for operating said pawl actuator to pivot said one or more pawls out of said belt-end connector space when said handle is manipulated.

4. The device as recited in claim 3 wherein said means for mounting said one or more pawls comprises:
means for mounting said pawls to one of said pair of metal plates.

5. The device as recited in claim 4 wherein said one plate has one or more pawl-receiving apertures and said means for mounting said pawls to said one of said pair of metal plates comprises the provision of:
a plurality of pivot flanges for said pawls, one pivot flange being provided for each one of said pawls and forming a portion of one of said pawl-receiving apertures; and
a pair of spaced lugs at one end of each of said pawls whereby each said pawl has its one end pivoted by its pair of spaced lugs on a pivot flange formed as part of the pawl-receiving aperture within which it is located.

6. The device as recited in claim 3 wherein:
said buckle includes a plastic base and said sub-assembly of metal plates has an upper plate and a lower plate;
said upper plate is provided with a plurality of integrally-formed spacer bosses, each having a fastener receiving bore; and
a plurality of fasteners is provided for holding said plates in a spaced, parallel relationship to each other and to said base.

7. The device as recited in claim 3 wherein:
said plate sub-assembly includes an upper plate and a lower plate;
a lightweight plastic base housing is provided to fit to the lower of said plates; and
said handle is provided in the form of a lightweight plastic cover rotatably-mounted to said subassembly in an overlying relation to said upper plate.

8. A lightweight, multiple-point, safety buckle for releasably-retaining one or more safety belt end-connectors of a safety harness, suitable for retention of aircraft pilots and/or passengers in their seats during emergency conditions, comprising:
a buckle housing, including a cover shaped to be grasped for manual rotation as a connector-release handle, and a buckle base, to enclose the buckle operative parts, said cover and base being formed of a lightweight plastic material;
not more than two metal plates, including an upper plate and a lower plate, and means for mounting them in a spaced relation to provide an end-connector receiving space therebetween within said housing, said housing having a plurality of connector-receiving apertures opening into said space between said plates; and
one or more connector-engaging pawls and means for mounting them within said housing and to said lower plate for pivotal movement into and out of said space between said plates.

9. The device as recited in claim 8 wherein said means for mounting said one or more pawls to said lower plate comprises:
one or more pawl-receiving apertures in said plate whereby a pawl may move through an associated aperture into and out of said space;
means formed integrally within each pawl for pivoting one end thereof on a portion of its associated pawl-receiving aperture; and
pawl biasing means underlying each pawl to position it in its associated aperture and bias it into said space.

* * * * *